US009953368B2

(12) United States Patent
Ellis et al.

(10) Patent No.: US 9,953,368 B2
(45) Date of Patent: Apr. 24, 2018

(54) EMBEDDED HARDWARE BASED SYSTEM WHICH PROVIDES REAL-TIME PRE-TRADE RISK ASSESSMENTS FOR MULTIPLE PARTIES AND METHOD THEREOF

(71) Applicant: Fixnetix Ltd., London (GB)

(72) Inventors: Paul Ellis, Trowbridge (GB); Alasdair Moore, Wimbledon (GB); Hugh Hughes, London (GB); Matt Dangerfield, Milton Keynes (GB)

(73) Assignee: FIXNETIX, LTD., London (GB)

( * ) Notice: Subject to any disclaimer, the term of this patent is extended or adjusted under 35 U.S.C. 154(b) by 0 days.

(21) Appl. No.: 14/170,515

(22) Filed: Jan. 31, 2014

(65) Prior Publication Data

US 2014/0207649 A1     Jul. 24, 2014

Related U.S. Application Data

(63) Continuation of application No. 13/298,280, filed on Nov. 16, 2011, now Pat. No. 8,655,767.

(60) Provisional application No. 61/414,832, filed on Nov. 17, 2010.

(51) Int. Cl.
| | |
|---|---|
| *G06Q 40/04* | (2012.01) |
| *G06Q 40/08* | (2012.01) |
| *G06F 3/06* | (2006.01) |
| *H03K 19/173* | (2006.01) |
| *G06Q 99/00* | (2006.01) |
| *G05B 19/418* | (2006.01) |
| *G06F 9/46* | (2006.01) |

(52) U.S. Cl.
CPC ............. *G06Q 40/04* (2013.01); *G06Q 40/08* (2013.01)

(58) Field of Classification Search
CPC .......... G06G 1/14; G06Q 20/00; G06Q 99/00; G06Q 40/00; G06F 17/60; G06F 9/46; G05B 19/418; H03K 19/173
See application file for complete search history.

(56) References Cited

U.S. PATENT DOCUMENTS

| | | | | |
|---|---|---|---|---|
| 7,035,953 | B2 * | 4/2006 | Krontz | G06F 11/0721 |
| | | | | 710/301 |
| 7,287,001 | B1 * | 10/2007 | Falls | G06Q 10/087 |
| | | | | 235/383 |
| 7,554,357 | B2 * | 6/2009 | Chen | G06F 17/5054 |
| | | | | 326/39 |

(Continued)

OTHER PUBLICATIONS

Coffey, B. (1997). Risky business catches up with hedge funds. Wall Street & Technology, 15(2), 52-54. Retrieved from https://search.proquest.com/docview/206627742?accountid=14753.*

Graboyes, Fredrick (2005). TradeTrek securities launches algorithm trading solutions; broker-dealer offers conflict-free algorithm-based trading. (Jan. 18, 2005). Business Wire Retrieved from https://search.proquest.com/docview/445504416?accountid=14753.*

(Continued)

*Primary Examiner* — Muriel S Tinkler
(74) *Attorney, Agent, or Firm* — Sheppard Mullin Richter & Hampton LLP

(57) ABSTRACT

A risk assessment system and method are provided that may be implemented as an embedded hardware based system and method that provide real-time pre-trade risk assessments for multiple parties, in addition to real-time market data and trading connectivity to a variety of liquidity venues. The liquidity venues may include regulated exchanges, ECNs and other financial institutions listing securities, options, futures, commodities, foreign exchange and other financial instruments.

75 Claims, 4 Drawing Sheets

(56) References Cited

U.S. PATENT DOCUMENTS

| | | | |
|---|---|---|---|
| 7,778,915 B2 | 8/2010 | Angle et al. | |
| 8,010,442 B2 | 8/2011 | Angle et al. | |
| 2002/0147605 A1* | 10/2002 | Southworth | G04G 15/00 705/26.1 |
| 2004/0236669 A1* | 11/2004 | Horst | G06Q 40/04 705/37 |
| 2006/0155553 A1* | 7/2006 | Brohman | G06Q 10/0635 705/7.28 |
| 2008/0155213 A1* | 6/2008 | Elliott | G06F 11/2094 711/162 |
| 2010/0005036 A1 | 1/2010 | Kraus et al. | |
| 2010/0332862 A1* | 12/2010 | Lester | G06F 1/30 713/300 |
| 2011/0161220 A1 | 6/2011 | Cole et al. | |
| 2014/0082279 A1* | 3/2014 | Kimmel | G06F 3/0605 711/114 |
| 2016/0139999 A1* | 5/2016 | Gabler | G06F 11/2007 714/4.11 |
| 2016/0253471 A1* | 9/2016 | Volpe | A61N 1/3968 607/5 |

OTHER PUBLICATIONS

Asselbergh, G. (1999). A strategic approach on organizing accounts receivable management: Some empirical evidence. Journal of Management & Governance, 3(1), 1-29. Retrieved from https://search.proquest.com/docview/200630802?accountid=14753.*

Walsh, P. D., "A matched case evaluation of robbery countermeasures utilized in fixed business locations," The University of Southern Mississippi, Dec. 2006 (244 pages).

PCT International Search Report of PCT/IB11/02994; dated May 24, 2012 (2 pages).

PCT Written Opinion of the International Searching Authority of PCT/IB11/02994; dated May 24, 2012 (4 pages).

PCT International Preliminary Report on Patentability of PCT/IB11/02994; dated May 21, 2013 (1 page).

Hawkesworth, I., Bergvall, D., Emery, R., & Wehner, J. (2008). Budgeting in Greece. OECD Journal on Budgeting, 8(3), 77-126. Retrieved from http://search.proquest.com/docview/199551263?accountid=14753 (51 pages).

* cited by examiner

EMBEDDED HARDWARE BASED SYSTEM WHICH PROVIDES REAL-TIME PRE-TRADE RISK ASSESSMENTS FOR MULTIPLE PARTIES AND METHOD THEREOF

PRIORITY CLAIMS/RELATED APPLICATIONS

This application claims priority under 35 USC 120 to, and is a continuation of U.S. patent application Ser. No. 13/298,280, filed on Nov. 16, 2011 (now U.S. Pat. No. 8,655,767 issued on Feb. 18, 2014) which in turn claims the benefit, under 35 USC 119(e) to and priority under 35 USC 120 to U.S. Provisional Patent Application Ser. No. 61/414,832 filed Nov. 17, 2010 and entitled "Embedded Hardware Based System Which Provides Real-Time Pre-Trade Risk Assessments For Multiple Parties And Method Thereof", the entirety of which is incorporated herein by reference.

FIELD

The disclosure relates generally to a system and method for assessing trade risk for multiple parties and in particular to an embedded hardware system for doing the same.

BACKGROUND

There are currently various systems that are commercially available to financial market participants and their clients which provide a combination of both pre and post trade risk assessments, real-time market data and also trading connectivity to numerous liquidity venues listing financial instruments comprising of securities, options, futures, commodities and foreign exchange. The aim of such systems is to provide financial market trading participants with the fastest available electronic market data and trading connectivity to liquidity venues, while also providing intra-day trading risk assessments for both the participant and also their own electronically connected trading clients.

Since the advent of electronic trading in the 1980's, the number of electronic liquidity venues around the globe has increased dramatically and has resulted a continuing rise in both market data and trading volumes. Since the 1990's greater market data and trading volumes have also been exacerbated by an increase in what is termed Automated Trading (AT), whereby trading entities have utilised computer systems to listen to market data streams and send automated orders to liquidity venues based upon pre-determined criteria. These increases in both liquidity venues and market volumes have increased the trading opportunities for both financial market participants and their clients alike. However as a consequence, they have also led to an unceasing demand to reduce the time latency involved in processing ever expanding market data streams, assessing pre and post trade risk and ultimately sending orders and receiving trades from liquidity venues.

The ability to reduce the latency involved within the market data, risk and trading cycle increases the potential for competitive advantage for both financial market participants and equally their end clients. Market participants that combine the fastest access to liquidity venue real-time market data, real-time risk assessment and also real-time trading will be able to execute trades ahead of their market competitors and ultimately will be more attractive to potential clients, due the likely increase in profits that their higher performing systems will produce. Conversely, the ability to provide pre-trade risk analysis on a more timely basis reduces the potential for market participants and their clients making a trading loss, as market risk exposure can be more accurately calculated and automated remedies enforced. Consequently, the current market place surrounding electronic market data, risk assessment and trading access, is an environment in which the majority of commercial solution providers are constantly seeking to reduce the time latencies of their products to as near to zero as is technically possible.

To date, all companies making commercially available systems have written their software applications to operate on standardised computer hardware incorporating main components of a mother-board, hard-drive, memory, processor/s with a kernel, along with a standard recognised operating system, for example; Unix, Linux or Windows etc. The applications are normally written in standard software languages such as Java, C++ and any other C based languages. The software languages themselves add a given amount of latency to the applications as they are not always specifically designed to provide the lowest functional latency.

System latency reductions up until this point have therefore been gained through increasing and/or refining any one of the main components; for example, increasing computer memory or increasing the capacity and speed of the computer processor. Performance benefits have also been achieved by refining and tuning the software applications to operate at ever greater capacity and speeds.

However, while all of these remedies have helped to improve system performance over recent years, the ability to reduce latency to even closer to zero is at present constrained by the current design in computers that are comprised of multiple components and also the fact that current commercial software providers are only able to utilise this type of industry standard hardware within their applications.

The major issue with current hardware is that each internal computer component including the operating system takes a specific amount of time latency to communicate with other internal and external components via the kernel. The communication between computer components is naturally essential to the operation of current combined market data, trading and risk applications. However, whether the delay occurs in reading a market data stream, analysing current risk or in sending orders to a liquidity venue, the impact is that the overall combined latency of all the functions is increased while each component related to each business function seeks to communicate with other components within the computer mechanism via the internal Bus. This problem has also been exacerbated by current transmission protocols such as TCP/IP and UDP which both add additional latency to current commercially available systems. Inherent to this latency issue is also the current design of PCB's which have not been designed to have functional components situated within close proximity so as to reduce the communication latency between each other.

The latency that each of the components adds to the market data, trading and risk functions reduces the trading potential of the participant and conversely increases the risk to the participant of having over or under exposure to liquidity venues in terms of their overall trading strategy. As a consequence, all existing combined data, trading and risk application solutions suffer latency constraints from the design of current computer hardware which is potentially detrimental to both the trading participant and also their clients.

It is therefore these latency issues that the disclosure below seeks to address by circumventing the issues of current hardware design. Thus, it is desirable to provide an embedded hardware based system which provides real-time pre-trade risk assessments for multiple parties and method thereof and it is to this end that the disclosure is directed.

BRIEF DESCRIPTION OF THE DRAWINGS

To help clarify the specific embodiments of the disclosure, diagrams have been appended to this application and the diagrams are intended to depict examples of the configuration of the system and method and, given the inherent adaptability of the system, the drawings should not be considered to limit the scope of the disclosure.

DETAILED DESCRIPTION OF ONE OR MORE EMBODIMENTS

Figure 1A:
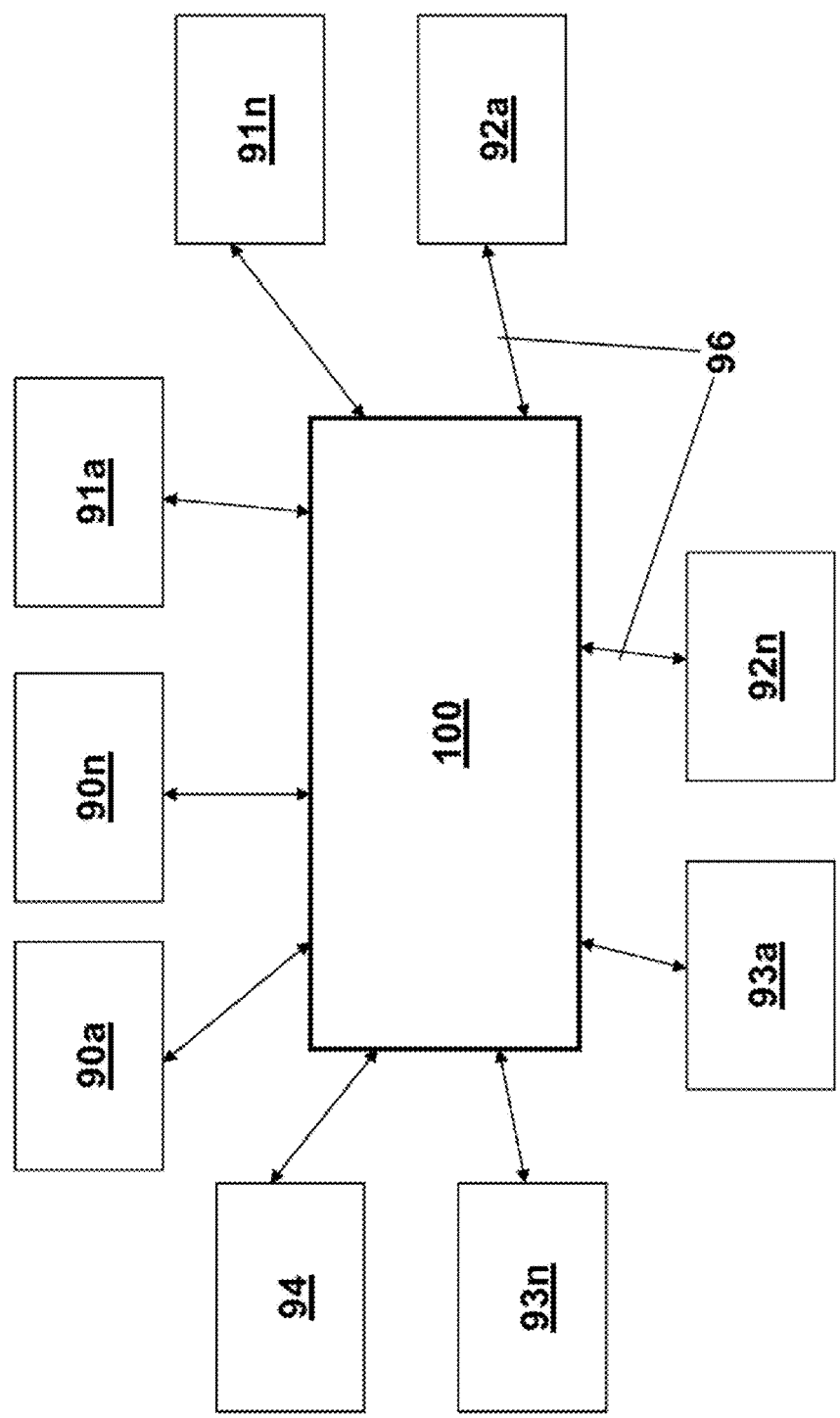
FIG. 1a illustrates a risk assessment system.

The disclosure is particularly applicable to a programmable logic device (PLD) microchip embedded risk assessment system and method and it is in this context that the disclosure will be described. It will be appreciated, however, that the system and method has greater utility since the embedded system may be implemented in other architectures, with other embedded systems and implementations and/or in other manners than those disclosed below, but that which are within the scope of the disclosure.

A risk assessment system and method are described below that may be implemented in an embedded hardware based system and method that provides real-time pre-trade risk assessments for multiple parties, in addition to real-time market data and trading connectivity to a variety of liquidity venues comprising regulated exchanges, Electronic Communication Networks' (ECN's) and other financial institutions listing securities, options, futures, commodities, foreign exchange and other financial instruments. The system and method, however, are not limited to any particular liquidity venues since the risk assessment system and method may be used with any current liquidity venues as well as future liquidity venues in which it is desirable to perform risk assessment. The system is designed for use by financial market participants and their clients who seek to use real-time market data streams to provide real-time pre-trade risk assessments in order to trade a variety of financial instruments within multiple liquidity venues.

A typical example would be a participant who is trading equity products across multiple venues such as NASDAQ, NYSE, BATS and Direct Edge in North America. For each market venue, the system would provide a list of tradable stocks specific to that participant i.e. it would filter out stocks that the client would not be permitted to trade. The list of available stocks would be sent to the system for the participant to trade according to his trading strategy. In the case of a Daily Market Cap (Traded Cash volume per day), the system would aggregate all trades across all venues and subtract their value from the Participants pre-defined Daily Market Cap up to the point that the limit was reached. It would then reject all orders that would breach the Daily Market Cap limit.

In one embodiment, the risk assessment system uses programmable logic devices (PLDs) which are then programmed to provide real-time pre-trade risk assessments for multiple parties and also provide real-time market data and trading connectivity to a variety of liquidity venues comprising regulated exchanges, ECN's and other financial institutions listing securities, options, futures, commodities, foreign exchange and other financial instruments. The system reduces the latency or time delay in providing each of the market data, trading and pre-trade risk functions for both market participants and their clients. In reducing market data latency, the system increases trading performance by reducing the time taken to send and receive orders from liquidity venues, while also reducing the time taken to provide real-time intra-day risk analysis which in turn helps to improve the financial integrity of the liquidity venue, the market participant and also their end clients.

The system resolves the latency constraints inherent within typical computer designs that prevent financial market participants from operating combined market data, trading and risk functions and the system provides as close to zero latency as is possible. The limiting factor in achieving zero latency being the operating frequency of the hardware application. The system differs from conventional systems because the design is based upon an embedded system, such as Programmable Logic Devices (PLDs) in one implementation, that contains all the major functional requirements of market data, trading and risk programmed directly into one or more embedded modules, such as the PLDs. In different implementations of the system, the embedded system modules may each be a Complex Programmable Logic Device (CPLD), Field Programmable Gate Arrays (FPGA), Field Programmable Object Arrays (FPOA) or an Application-Specific Integrated Circuit (ASIC) microchips and finally on-chip microcontrollers with or without flash stored computer code. In one implementation, the embedded system modules are installed directly onto a surface, such as a printed circuit board (PCB), which is loaded into a single housing with a resilient power supply unit. Each module that is part of the embedded system may have its own separate Network Interface Card (NIC) that allows communication with external systems.

The risk assessment system with the one or more modules has the market data, trading application and risk application written into the one or more modules and the system is made up of a number of separate sub systems known as personalities. The separate sub-systems (the personalities) may include Service Module, Market Data, Liquidity Venues, Market Execution Participants, Clients, Log Auditor and Command & Control as shown in FIG. 1 which illustrates an example of one set of the different personalities. In the system, new personalities can be added to the modules as may be required. In an implementation using the PLDs for the modules, the functions contained within each personality may be written into each PLD using VHDL (VHSIC (Very High Speed Integrated Circuits) Hardware Description Language). VHDL is a standard Hardware Description Language specifically designed to describe the behaviour of a physical circuit or microchip. Unlike traditional languages that operate sequentially, VHDL code operates concurrently which as a consequence allows for vastly reduced operational latency as the code is able to operate more functions simultaneously. Another of the advantages of using an embedded system, such as the PLDs, over a traditional hardware solution is that the modules containing each personality are able to communicate with each other via a direct connection on the PCB as opposed to having to access other separate components via the kernel and micro-processor that leads to a decrease in operational latency. The method implemented by the system reduces operational latency by writing the functional Data, Trading and Risk application directly onto the embedded modules as opposed to writing a similar application in software installed on a hard-drive as is currently the standard commercially available method. VHDL therefore allows the solution to make use of the performance advantages offered by the hardware architecture which is where the major latency reduction over current computer software solutions is derived.

FIG. 1a illustrates a financial data system that has a risk assessment system 100. The risk assessment system is capable of being coupled to various external systems to which the financial data system interacts and exchanges data. For example, the risk assessment system 100 is capable of being coupled to one or more clients 90a, . . . , 90n who are each users who use the risk assessments made by the system to engage in trades and the like, one or more market execution participants (Brokers or Prime Brokers) 91a, . . . , 91n who can execute a trade when it is made on one or more liquidity venues 92a, . . . , 92n. One or more market data sources 93a, . . . , 93n from which market data is extracted/retrieved/scraped, etc. is used for the risk assessment and other input/outputs 94 for the system.

The risk assessment system 100 supports various protocols used to communicate between the risk assessment system 100 and external systems as shown in FIG. 1a over a set of external communication links 90, . . . , 93. Each external communication link may support a TCP/IP, Multicast, Financial Information Exchange Protocol (FIX), ITCH, OUCH and other industry standard formats as operated by both liquidity venues and trading participants. In addition the system can operate with different transport mechanisms including Ethernet connectivity and also switched fabric systems such as InfiniBand. Furthermore, new communication protocols can also be easily added to the risk assessment system 100 to ensure that the system meets current industry standards. The operator can thus use a variety of protocols to make a connection to the risk assessment system in order to access the functional system.

Figure 1B:
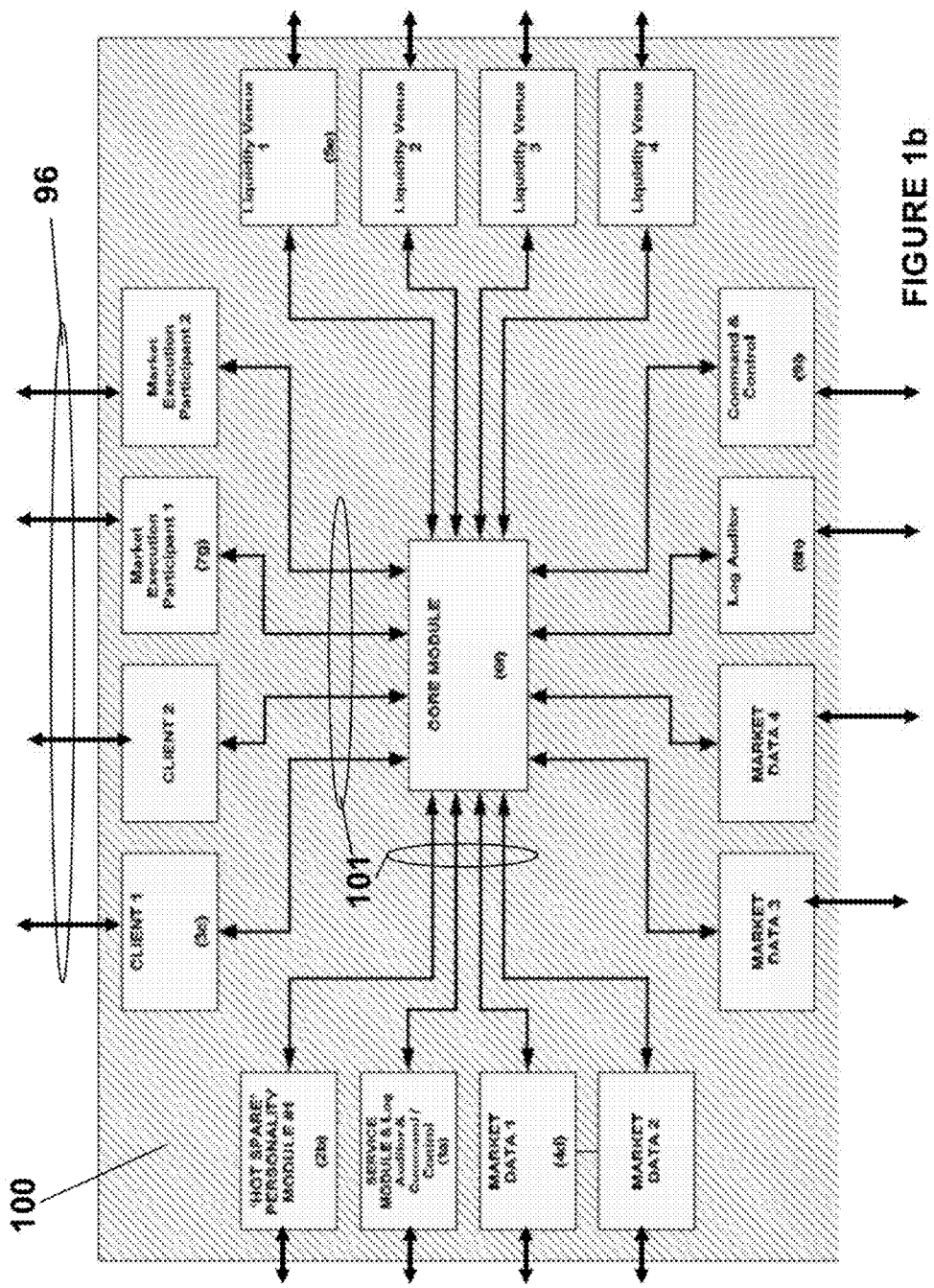
FIG. 1b is a high level system configuration diagram of an implementation of a risk assessment system that uses embedded modules housing the personalities containing the business process logic that operates within the risk assessment system.

FIG. 1b is a high level system configuration diagram of an implementation of a risk assessment system 100 (also known as a financial data processing system) that uses embedded modules housing the personalities containing the business process logic that operates within the risk assessment system. The financial data processing system 100 provides an integrated market data, trading and pre-trade risk function installed on an embedded system, such as one or more PLDs, instead if a traditional software solution installed on a hard-drive. The purpose of the system is to provide the fastest financial industry standard functions related to reading and converting market data streams, providing trading functionality to liquidity venues, while also providing pre-trade risk assessments for market participants and their clients. The system provides a methodology advantage over traditional systems in that all the processes and risk checks (described in more detail below) are programmed directly onto the embedded system which allows faster analysis and trading throughput to liquidity venues.

The CPLD, FPGA or FPOA described above is an integrated microchip designed to be configured by the user after manufacturing. The first embodiment of the system and method involves utilizing the FPGA to provide market data, order management and pre-trade real-time risk from a programmable chip installed on a printed circuit board (PCB). A second embodiment of the system and method utilizes FPOAs which can operate up to four times faster than standard FPGAs. A third embodiment of the system and method may utilize ASIC microchips to potentially provide even greater latency reductions. The ASIC microchips would be designed in advance rather than being programmed or coded after manufacture, but would provide the same market data, trading and pre-trade risk functions as programmable CPLD's, FPGA or FPOA microchips.

The advantage of the embedded system module approach is that there is none of the traditional latency delays associated with conventional market data, trading and risk functions operating in a traditional server design made up of separate components of hard-disk, processor and memory etc. By combining all three elements on embedded modules, the communication times between the three required functional elements (market data, trading & risk) are reduced to a minimum. Embedding the entire combined market data, risk and trading application on an embedded system allows the operator to leverage operating speeds at least (n) times faster than current commercially available systems using standard hardware configurations wherein "n" is dependent upon the type of embedded module utilized within the system. For example, current commercially available systems operate pre-trade risk checks with an approximate latency of 250 Milliseconds (ms). The embedded device with PLDs, for example, can operate risk checks with a latency of less than 5 Microseconds (us), i.e. approximately 5000 times faster.

The functional system containing the market data, trading and risk application logic is written directly to the embedded modules and is made up of a number of separate sub systems known as personalities. As shown in FIG. 1, the personalities may include a service module (1a), one or more market data modules (4d) (with four market data modules existing in the example implementation of the risk assessment system in FIG. 1), one or more liquidity venue modules (5e) (with four market data modules existing in the example implementation of the risk assessment system in FIG. 1), one or more market execution participant modules (7g) (with two modules existing in the example implementation of the risk assessment system in FIG. 1), one or more client modules (3c) (with two modules existing in the example implementation of the risk assessment system in FIG. 1), a log auditor module (8h), a core module (6f) and a command & control module (9i). Additional personalities can be added into the system as may be required. The data Transport within the risk assessment system over a set of internal links 101 that are controlled by the VHDL code which is significantly faster than standard applications using current internal transport protocols. This again reduces operational latency within all the business logic functions as all of the personalities are able to communicate with each other at much faster speeds.

The personalities within the system each provide a certain aspect of functional logic as required within the overall market data, trading and risk system. In certain embodiments of the system, each personality may be assigned its own dedicated hardware microchip that in turn communicates with other personalities on separate microchips. The system may also contain a 'hot standby' chip that can back-up any one of the other personalities should they suffer an internal failure. Each personality is configured to poll other personalities within the system and in the event of failure, the hot standby chip immediately replaces the personality of the failed module. In another embodiment of the system, the system may use a single ASIC chip to house all the functional logic of the personalities and the ASIC chip would be replicated on the PCB to provide resilience in the event of primary ASIC application failure.

In the embodiments of the system that uses the PLDs, the approach benefits from having all the functional personalities installed on the same printed circuit board (PCB) without the need to communicate via a kernel, as is the case with current commercially available solutions. This design approach reduces the latency involved in the various personalities (required functions) communicating with each other. The embodiment of the system that uses a single ASIC chip installed on a single PCB would contain all the personalities and the associated functional logic so likely provides the lowest time latency and all the functional logic contained on a single ASIC chip would negate the need for separate personalities to communicate across the PCB and Core Module. This in turn would allow for much faster processing internally within the single ASIC chip and would provide faster market data stream conversion, faster risk assessments and ultimately faster order throughput to liquidity venues.

The personalities within the risk assessment system each provide a certain aspect of functional logic as required within the overall market data, trading and risk system. Each personality within the risk assessment system is assigned its own dedicated module that in turn communicates with other personalities on separate modules as shown in FIG. 1b. The design of each personality module is shown in more detail in FIG. 2 which shows the internal configuration of the personality module and is described in more detail below.

Upon start-up, the system 100 as shown in FIG. 1b is controlled by the Service Module personality (1a) which is the master control process and controls the start-up of the other available personalities. Once the power up is completed, the Service Module personality 1a will seek to initiate connections to all available personalities within the risk assessment system 100. In the event that the Service Module personality 1a fails, it will also be polled by the other available personalities and subsequently shut down and re-started on the hot spare (2b). Due to the system being embedded, each Personality module is available for use almost instantly upon system power up, unlike traditional systems whereby the hardware must go through boot-up cycle The Hot Spare personality module (2b) is a personality designed to replicate any other personality in the event of primary personality failure. Again due to the fact that the personality is embedded on the module, in the event of a primary personality failure the new Back-up personality on the Module (2b) will be available for use in approximately 2 seconds post the analysis of the primary personality failure.

The system is designed so that each personality within the risk assessment system 100 polls the other available personalities to check their integrity using the internal links 101. In the event that a certain personality is deemed to have suffered an error, the personality is cut-off by the other remaining personalities in order to maintain overall system integrity. The personality that is deemed to have failed is then restarted on the 'Hot Spare' personality (2b). The system is able to achieve this because the application code for each personality including spare personalities is held within the firmware. This means that the hot standby (2b) contains a spare personality for each of the primary personalities within its memory. The polling process between primary personalities facilitates a constant health check for the entire Risk application ensuring that failed personalities are quickly shut down and replaced by back-up personalities held in the Hot Standby (b2). There can be multiple instances of the hot spare personalities 2b to provide resilience throughout the system.

Figure 2:
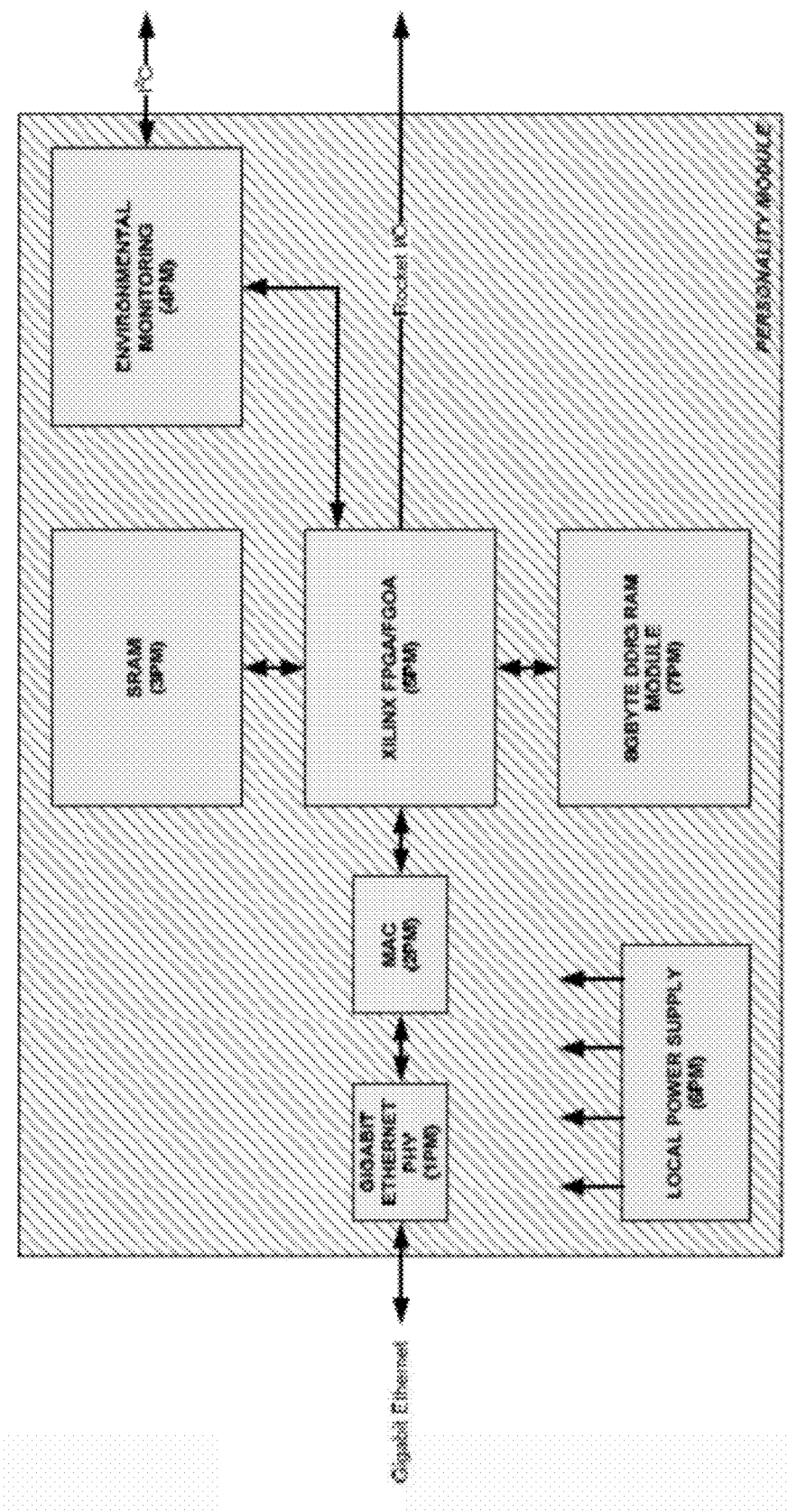
FIG. 2 is an example of an implementation of a personality module of the risk assessment system in FIG. 1.
Figure 3:
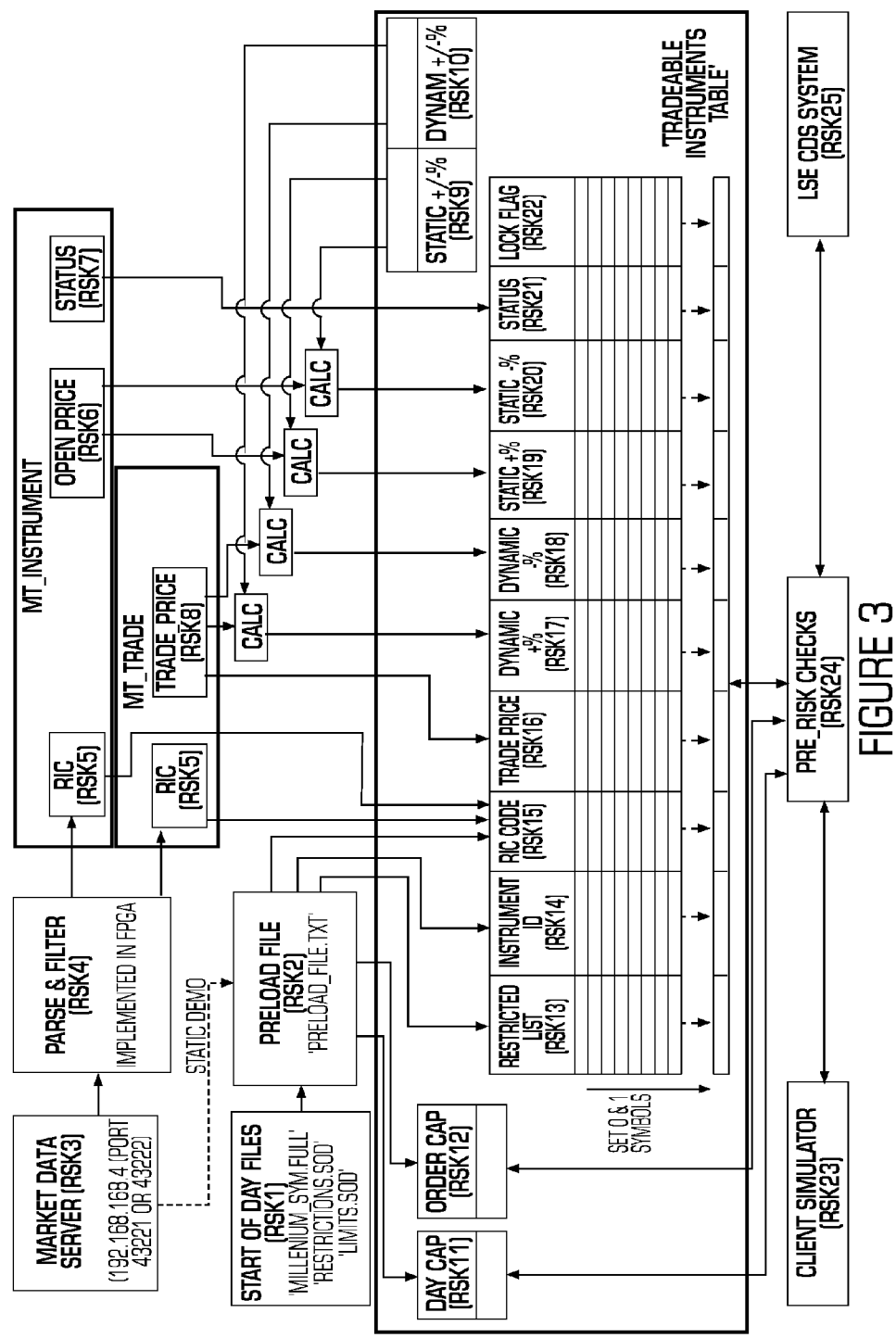
FIG. 3 is a diagram that illustrates an example of a risk assessment method that may be Implemented using the risk assessment system in FIG. 1 that has a set of risk checks and processes that may be as performed by the personality module(s) within the risk assessment system.

The command and control module (9i) has a primary function that is to allow control and configuration of the other personalities within the risk assessment system 100. Within command and control module (9i) is an X86 interface (over the internal link 101 with the command and control module 9i that allows an external operator to interact with the risk assessment system from their own computer in order to program and configure existing personalities. The programming may include configuring client personalities with pre-determined risk criteria, Market Execution participants with risk criteria or simply configuring new or existing Liquidity Venue and Market Data personalities. Examples of which can include: Instrument, Amount (Tradable number of given instrument), Price Deviation from market (93), Total value per order (consideration), Daily market Cap (Daily Cash Volume limit) and Value At Risk (VAR). The command and control module (9i) is backed up by the spare module 2b in the event of primary failure. An example of using the X86 interface to re-program an existing personality would be if a client was being given a new Cash Limit for daily trading. In this instance, the Market Participant controlling the client would use the X86 to alter the (RSK 11) component as seen in FIG. 3 by means of the Component Ethernet component (1PM) as shown in FIG. 2.

The market data module (4d) personality (several are shown in FIG. 1b) allows for the collection of real-time market data streams from a variety of liquidity venues such as regulated exchanges, ECN's and other financial institutions listing securities, options, futures, commodities, foreign exchange and other financial instruments. As per other commercially available systems, the system converts the data streams into a single readable format that can be then utilised for trading and risk assessment purposes. The market data module 4d is capable of reading all of the current industry standard data formats such as ITCH, OUCH, and FIX and in addition it can be easily configured to read new market data streams. The data can be comprised of multiple levels to provide the operator with a view of the depth of the market for any given instrument. The market data personality also communicates internally within the risk assessment system with the client module(s) 3c and the market execution participant module(s) 7g. The market data module 4d is backed up by spare module 2b in the event of primary failure. The Liquidity Venue personality module(s) (5e) allow the client module(s) 3c and the market execution participant module(s) 7g to interact with the actual liquidity venue for the purposes of sending trade orders and for receiving notifications of order completions—both full and partial. Essentially, the module (5e) is coded directly to the Application Program Interface (API) of each required liquidity venue. The Liquidity Venues allows market participants to code directly to their core systems for the purpose of sending electronic orders. Depending upon the specific rules of the liquidity venue, this API interface will allow for the sending of orders and the reception of trade notifications from each venue. It is this personality (5e) that allows either the client module(s) 3c or the market execution participant module(s) 7g to submit orders to each specific liquidity venue and which also updates them with details of any order completions i.e. when a trade order message is generated by the client(s) 3c, the message will contain the ID of the Liquidity Venue and accordingly the order will be submitted by the appropriate 5e personality. The same 5e personality will also provide 3c with the details of any completed trade orders related to the original order instruction. The liquidity venue personality also communicates internally within the risk assessment system with the Client personality for the purposes of providing intra-day pre-trade risk assessment and acknowledgment of orders and completions. In addition, the liquidity venue module 5e also receives market data streams via 4d for the purposes of providing intra-day risk assessments. Multiple instances of Liquidity venue personalities can be configured according to the trading participants and the client's requirements. 5e would be backed up by 2b in the event of failure within the primary 5e component.

Each client personality module (3c) contains all the risk criteria relevant to a particular trading participant. A system administrator would normally utilise the command and control module 9i to configure the client's risk profile within the appropriate Market Execution Participant (7g) personality. For example, each client module 3c may be programmed with a daily Cash figure which would relate to the total amount in a given currency that a client would be allowed to trade at a liquidity venue. Every time that an order is sent to a liquidity venue that results in a trade, the value of the trade would be subtracted from the daily cash figure to leave a remaining daily amount of cash to trade. This figure would be used to verify the validity of all subsequent orders in that each new order would have its consideration (price×volume) checked against the remaining cash figure. In any instance where the value of the new order was greater than the remaining cash figure that order would be rejected and not sent to the liquidity venue. A message would however be sent to both the client and Market Participant informing them of the limit breach. The reason for this process is that there is a direct relationship between specific clients and market execution participants and by programming market execution participant module 7g with the profile of the client it ensures that there is a direct link between the client and the appropriate market execution participant.

As a result, each client module 3c receives its risk criteria by means of a 'Start of Day' (SOD) file which would be forwarded by the Market Execution Participant module 7g upon pre-market opening. Post market closure, the client module 3c will send an End Of Day (EOD) file to the market execution participant module 7g which will comprise the risk profile of the client at market close. The EOD file would be passed back to the client in readiness for the trading cycles of other liquidity venues based potentially in different geographical areas and listing different asset classes. This process ensures that the client's overall risk exposure is maintained across asset classes and across time zones. An example setting of a client's risk profile would be a limitation of the amount of daily volume (a Total Daily Cash Figure Limit) that a client is permitted to trade or alternatively a limitation on the specific stocks that the particular client is permitted to trade.

In the instance of a Daily Cash Figure Limit being in existence, the consideration (Volume×Price) of every trade that was executed at either a single or a multiple of liquidity venues would be aggregated to produce a real-time Cash figure total. This figure would be subtracted from the pre-programmed Daily Cash Limit figure to produce a figure containing the remaining cash limit available to trade on that day. All subsequent orders would thus be pre-validated by ascertaining their cash value (Quantity×Price) and checking to see if this cash amount was less than the remaining daily cash value figure. If the cash value figure was less than the daily figure, the order would be validated for entry to the market, however if the value was less than the remaining daily figure, the order would be denied and the send or of the order would be sent a message informing them of the reason for the order rejection.

The actual client utilising the personality would connect their own trading system by means of the in-built NIC card, PCIe or InfiniBand within the module housing the client personality 3c. This would allow for the free flow of trading messages and acknowledgments from the liquidity venue via the client personality 3c. The client personality 3c communicates with the market data personality(ies) 4d in order to check pre-trade risk criteria such as whether the order was within current liquidity venue price limits. If the order was deemed as within acceptable limits, it would be forwarded to the appropriate liquidity venue. Each client module 3c is capable of providing all of the industry standard pre-trade risk checks and analysis including Order Quantity, Price, Price×Quantity, Average Daily Volume, Total Daily Volume, Value At Risk (VAR) and % from last traded price. In addition, each client module 3c also provides a market surveillance check concerning orders of the same direction, price, side, price and quantity. Each client module 3c also contains functionality concerning restricted lists specifically concerning stocks or instruments that a given client is for whatever the reason prevented from trading by the Market Execution Participant (7g) or liquidity venue (5e).

While the system contains all the usual industry standard risk checks, it nevertheless differs from traditional pre-trade risk systems in that it keeps its own record of a trading participants liquidity venue orders and in doing so it alone decides upon the existence of orders at the liquidity venue, rather than the traditional approach of waiting for an electronic confirmation from the venue to prove the orders existence. This design approach means that the system prevents a user from sending multiple orders to market in the belief that none of them have so far executed. The system essentially utilizes a 'what if' process to prevent realisation of a bad position or trade by assuming that any order sent to a liquidity venue is already complete, thus avoiding overexposure within a given instrument. The reason for this approach is that, by its design, the system 100 seeks to significantly reduce the latency within the market data, trading and risk cycle. It is therefore foreseen that there may be occasions where the System will suffer delays while liquidity venues process and acknowledge the trade orders generated within the System. If the system was programmed like existing pre-trade risk systems it would need to wait for the sequential order acknowledgments from each liquidity venue prior to sending any subsequent orders, updates or indeed cancellations. Despite the System being able to process market data streams in advance of other competing systems, much of the latency advantage inherent within the System would be lost while it waits for liquidity venues to respond to its previous trade messages such as an order entry, cancel or amendment. Consequently the system allows both the client and the execution participant to send new order instructions to a liquidity venue despite the previous acknowledgement having not yet been received. This is done on the basis that it assumes that the previous order will ultimately be acknowledged and accordingly it has already updated the risk profile of both the client and the market execution participant to allow submission of new instructions to the liquidity venue i.e. it has already debited or credited the trading accounts. This allows both the client and the market execution participant to continually take advantage of faster market data streams without having to continually wait for the liquidity venue trading system to catch up.

In the event that a previous market order is not acknowledged, the client 3c and the market execution participant 7g cannot trade over their pre-determined cash figure because the system already assumes that the trade has occurred. In the rare case that a trade message was not acknowledged by a liquidity venue, the system 100 is designed to allow manual intervention so that the missing trade message can be struck and all the risk profiles updated accordingly. The Client personality (3c) is backed up by 2b in the event of primary failure.

The market execution personality (7g) is similar in nature to the client module 3c. The market execution personality 7g would normally contain the details of the broker operating the risk assessment system whose liquidity venue membership the risk assessment system would use to send orders. As such it would contain the risk profile of the Execution Participant through whose membership the clients would be sending orders to the liquidity venue. However, in addition, it also contains the SOD risk profile of any related client who would be using the market execution participant to access a liquidity venue. The SOD file would be sent to the appropriate client personality 3c pre market-open each day. In addition, the market execution personality 7g would also receive the EOD file from each client post-market closure at each liquidity venue. The EOD file would be passed back to the client personality at the start of trading phases at other liquidity venues. This would ensure that the clients overall risk profile is always accurate across all liquidity venues and time-zones. The market execution personalit(ies) 7g can be replicated by 2b in the event of primary failure.

The Log Audit personality (8h) is responsible for keeping records of all communications both to and from all personalities within the risk assessment system. This includes all records of submitted trade orders by both the client personality and also the market execution personality. It also keeps records of all liquidity venue trade executions both full and partial. All records are time stamped to the nearest Nano Second so that in the event of an investigation the Audit trail will provide a sequential view of all actions and responses both within the risk assessment system but also by external connections such as the client, market execution personality and also the liquidity venue. The Log Audit personality also keeps time stamped records of all configuration changes by the system administrator using the command and control personality. This is to ensure that the configuration of the risk assessment system can be audited and that any changes relating to for example a client's risk profile can be fully recorded and checked against the pre-determined risk profile of the said client. In the event of failure within the primary (8h) it would be backed up by 2b which would replicate its functions within the risk assessment system.

The Core Module 6f provides physical connections to each of the personalities within the risk assessment system. Like all the personalities the core module is installed directly on the PCB. The core module contains a number of pins in its physical design that allow the personalities to connect directly to it via the PCB. The Core Module thus provides the physical interconnections that allow personalities to connect with other personalities within the System design. The core personality can be replicated by 2b in the event of primary failure.

In FIG. 2, the configuration of a hardware personality module within the risk assessment system 100 is shown in more detail. The module is made up of a Gigabit Ethernet PHY component (1PM) which is used to communicate externally with the personality for the purposes of installing and updating the configuration of the personality code. For example, this could be for the purposes of changing individual risk limits as previously detailed. The component (1PM) communicates with a MAC interface component 2PM which is used for the purposes of translating between external IP (remote) addresses and the internal MAC address on the Ethernet interface (1PM). The MAC address is used for all internal communication across the personality.

The module may also have a central processing component 5PM that may be, for example a FPGA/FPOA, such as commercially available from XILINX, which is the type of FPGA card being used for the purposes of this diagram. The 5PM component is where the main body of the personality logic is held. The module may also have an SRAM (3PM) that is a memory component used by the 5PM component. The components of the module are connected together as shown in FIG. 2.

The module may also have an environmental monitoring component 4PM that is used to monitor the physical health of the personality module by the master command and control module 9i (MCP) as shown in FIG. 1b. The 4PM component allows for power, heat and the logic of the personality in FIG. 2 to be checked and monitored by the MCP and allows for the MCP to decide whether the personality should be shut down and re-instantiated on a Hot Back-Up personality as shown in FIG. 1b. The module may also have a local power supply component (6PM) that is the power input to the Personality. The health of the power supply is checked and monitored by the 4PM component. The module may also have a DDR3 RAM Module (7PM) that is a memory component within the personality that contains the main internal memory of the personality. It has a higher frequency rate than the 3PM component and also a higher capacity.

FIG. 3 is a diagram showing the Main Risk Functions of the Personalities within the PCB. In the example shown in FIG. 3, the risk assessment system 100 connecting to the London Stock Exchange Test Trading System (CDS) with an onward connection to a Client's RISK simulator is shown. The main risk functions are initiated each day with the Start of Day file (SOD) (RSK1) which contains the risk limits and the stock restrictions for each client or market participant. The SOD is passed to the Preload File (RSK2) in order to create a preload file for either the client or the market participant. RSK2 is also sent a static data list from the Market Data Server (RSK3) which contains a list of the tradable Instruments at a particular Liquidity Venue. Combined together, the Static Data and Restriction lists form the preload File which is used for distribution across the personalities housed in the risk assessment system. The RSK 2 component sends the pre-load file firstly to the Day Cap (RSK11) component, then to the Order Cap (RSK12) and subsequently to the Restricted List (RSK13), Instrument List (RSK14) and finally to the RIC Code component (RSK15).

The day cap component RSK 11 provides the risk check on the daily cash amount that a client or market participant is allowed to trade on a given day. The RSK 12 Component provides the risk check on the cash amount per order that can be sent i.e. the physical upper limit on the value of a single trade order. The RSK 13 component is the record of the restricted list of instruments per client/per market. In essence it is a list of instruments that for a variety of reasons the client is not permitted to trade. These restrictions could be implemented by the liquidity venue or the market participant.

RSK 14 is a list of tradable instruments that either a client or market participant is permitted to trade. RSK 15 is a list of RIC codes that are used to identify instruments across different exchanges. The codes are unique industry standard identifiers that help clarify that orders sent to market are targeted at the correct instrument. It can be seen therefore that the 5 components listed above all provide elements of risk filters that are required for the opening order sent to a Liquidity Venue.

The RSK3 component also provides all intra-day price updates (Price, Volume etc) pertaining to the tradable instrument list as sent as part of the pre-load file. From the RSK3 component real-time intraday market data information is sent to the Parse and Filter Component (RSK4). RSK4 is responsible for submitting the updated price information to the RSK5 components which ensure that each price update is attributed to the correct RIC code and ultimately the correct tradable instrument. If a client is submitting an entirely new Market Opening order, RSK5 will forward the order details to RSK6 in order to check the opening order price against the static data and also to the RSK19 component to ensure that the new order is within the allowable positive price range (%) and conversely to the RSK 20 component to check whether it is in the allowable negative % range. In addition it will also update the RSK 7 and RSK21 Status components to show the status of the new order submission.

For orders sent after the market open phase and also for any amendments to existing orders, the RSK5 component sends market data information to the Trade Price component (RSK 8). The RSK8 component in turns ensures that any new or amended orders are within the % limits of the current market price (A liquidity Venue trading requirement). RSK8 therefore sends the updates to the Trade Price component (RSK16), the Dynamic negative % component (RSK17) and finally the Dynamic positive % component (RSK18).

Along with the Static % check (RSK9) and the Dynamic % check (RSK10) orders are checked against the current market data stream for dynamic positive % changes (RSK17), dynamic negative % changes (RSK18) and against the last Trade Price (RSK16).

The Lock Flag Indicator RSK 22 is used to check whether the liquidity venue has suspended any tradable instruments intra-day. Any instruments that have been issued with a lock flag will not allow users (clients or market participants) to submit new orders to the market for the given instrument (identified by RIC code).

The combined output from all the components listed above allows the Pre-Risks Checks Components (RSK24) to determine whether new and subsequent orders are valid and can be sent to the liquidity venue of choice. Each component therefore checks the order against its own limits within the preload file and also against the intra-day file for the given customer or market participant. If each component confirms that the order is valid (in terms of the pre-determined limits) the RSK 24 component will send the order to the liquidity venue (in the attached FIG. 3—The London Stock Exchange test trading system) and will finally update the client trading simulator (RSK23).

The advantages of utilizing risk assessment systems as opposed to traditional software are multiple. Firstly the latency involved in reading multiple market data streams will be vastly reduced which will lead to additional latency benefits in the speed and accuracy of both risk analysis and also trading performance. In addition, the ability to receive market data at faster speeds allows the operator to make more informed decisions relating to their trading strategy. This also manifests itself in being able to analyze risk positions more accurately, as the faster market data interpretations provide a more relevant picture of risk exposure both for the market participant but also the end client. Secondly, by improving the speed and accuracy of market data and risk analysis, trading participants can utilize their trading capital more efficiently and with less risk of intra-day exposure. It is predicted that the risk assessment system should be able to achieve a total latency figure for all of these market data, trading connectivity and risk analysis of sub-millisecond (Ms) excluding external transport protocols. From a pure electronic system design perspective, the system offers additional benefits in that it is far smaller in size the current commercial computer systems and as a consequence uses far less real-estate and also power in order to function. This reduced foot-print has additional benefits in that the System requires far less cooling than traditional systems thus reducing the carbon footprint still further.

While the foregoing has been with reference to a particular embodiment of the invention, it will be appreciated by those skilled in the art that changes in this embodiment may be made without departing from the principles and spirit of the disclosure, the scope of which is defined by the appended claims.

The invention claimed is:

1. An embedded risk assessment system, comprising:
   a printed circuit board;
   one or more programmable logic devices installed on the printed circuit board in electronic communication with each another, the one or more programmable logic devices comprising two or more personality modules, wherein
     the two or more personality modules are selected from a group consisting of a client personality module, a market participant personality module, a liquidity venue personality module and a market data personality module,
     the two or more personality modules are configured to collectively perform pre-trade risk assessment for a client,
     each client personality module comprises a set of risk criteria for a particular client and is configured to forward a trade order for the particular client to a liquidity venue if the trade order satisfies the set of risk criteria,
     the two or more personality modules are written to the one or more programmable logic devices using VHSIC Hardware Description Language (VHDL), and
     the one or more programmable logic devices comprise at least one of a complex programmable logic device (CPLD), a field programmable gate array (FPGA), or a field programmable object array (FPOA); and
   a hot spare programmable logic device installed on the printed circuit board comprising a hot spare personality module, wherein
     the hot spare programmable logic device stores a set of code for each of the two or more personality modules so that the hot spare personality module can replicate any of the two or more personality modules should any of the two or more personality modules fail,
     the client personality module updates a risk profile of the particular client in real-time without reliance on order acknowledgements from the liquidity venue, wherein the updates to the risk profile are performed based on an assumption that all orders transmitted to the liquidity venue are completed even if order acknowledgements have not yet been received for the orders from the liquidity venue, and the client personality module permits transmission of subsequent orders by the particular client to the liquidity venue based on the risk profile of the particular client even if order acknowledgements have not yet been received for previous orders transmitted to the liquidity venue.

2. The system of claim 1, wherein the two or more personality modules are the client personality module, the liquidity venue personality module and the market data personality module, the client personality module having a set of risk data for a particular client, the liquidity venue personality module allowing the client personality module to interact with the liquidity venue to send a trade and receive notifications of a completed trade and the market data personality module gathering data about a particular market and wherein the client personality module and the liquidity venue personality module perform pre-trade risk assessment for the client with reduced latency.

3. The system of claim 1, wherein the two or more personality modules are the client personality module and the liquidity venue personality module, the client personality module having a set of risk data for a particular client, the liquidity venue personality module allowing the client personality module to interact with the liquidity venue to send a trade and receive notifications of a completed trade, and wherein the client personality module and the liquidity venue personality module perform pre-trade risk assessment for the client with reduced latency.

4. The system of claim 1, wherein the two or more personality modules are the market participant personality module and the liquidity venue personality module, the market participant personality module having a set of risk data for a particular market participant, the liquidity venue personality module allowing the market participant personality module to interact with the liquidity venue to send a trade and receive notifications of a completed trade, and wherein the market participant personality module and the liquidity venue personality module perform pre-trade risk assessment for the market participant with reduced latency.

5. The system of claim 1, wherein the two or more personality modules are the market participant personality module, the liquidity venue personality module and the market data personality module, the market participant personality module having a set of risk data for a particular market participant, the liquidity venue personality module allowing the market participant personality module to interact with the liquidity venue to send a trade and receive notifications of a completed trade, the market data personality module gathering data about a particular market, and wherein the market participant personality module and the liquidity venue personality module perform pre-trade risk assessment for the market participant with reduced latency.

6. The system of claim 1, wherein the two or more personality modules are the client personality module, the market participant personality module and the liquidity venue personality module, the client personality module having a set of risk data for a particular client, the market participant personality module storing a set of risk data for a broker in a liquidity venue, the liquidity venue personality module allowing the client personality module and the market participant personality module to interact with the liquidity venue to send a trade and receive notifications of a completed trade, and wherein the client personality module, the market participant personality module and the liquidity venue personality module perform pre-trade risk assessment for the client with reduced latency.

7. The system of claim 3, wherein the two or more personality modules are all on an Application-Specific Integrated Circuit.

8. The system of claim 1 further comprising a command and control personality module that performs start-up of the embedded risk assessment system.

9. The system of claim 8, wherein each of the command and control personality module and two or more personality modules poll the other personality modules to determine if a personality module has failed.

10. The system of claim 2, wherein the market data personality module collects real-time data from one or more liquidity venues and converts the real-time data from one or more liquidity venues into common format market data.

11. The system of claim 2, wherein the client personality module performs a market surveillance check for orders in one of the same direction, price, side, and quantity as an order of the client.

12. The system of claim 2, wherein the liquidity venue is one of a regulated exchange, an ECN and other financial institutions listing securities, options, futures, commodities, foreign exchange and other financial instruments.

13. The system of claim 2, wherein the client personality module controls one or more trades of the client based on the risk data for the particular client.

14. The system of claim 2, wherein the client personality module ensures regulatory compliance of the client by controlling access to multiple liquidity venues.

15. The system of claim 6, wherein the client personality module provides end of day data of a current risk profile to the market participant personality module for use in other physical locations.

16. The system of claim 8, wherein the command and control personality module enables remote control by an operator using a remote graphical user interface (GUI).

17. The system of claim 1 further comprising a log audit personality module that keeps a time stamped record of all message flows and configuration changes within the risk assessment system.

18. The system of claim 1 further comprising a market execution personality module that provides a start of day file of a current client risk profile to the client personality module.

19. The system of claim 1 further comprising a service module and log personality module that allows for manual intervention in the event of a trade message being lost or in error.

20. The system of claim 8, wherein the command and control personality module enables the configuration of new and existing personality modules with new risk profiles.

21. The system of claim 8, wherein the command and control personality module provides direct and exclusive control of the client personality module by a market participant operator.

22. The system of claim 8, wherein the command and control personality module filters incoming orders from one of the client personality module and the market participant personality module by a dynamic percentage price check in relation to a latest price held within the market data personality module.

23. The system of claim 8, wherein the command and control personality module filters incoming orders from one of the client personality module and the market participant personality module by a static percentage price check in relation to a market opening price.

24. The system of claim 1 further comprising a status personality module that records incoming orders from one of the client personality module and the market participant personality module in order to provide an independent view of a current risk status of orders.

25. The system of claim 1, wherein incoming orders from one of the client personality module and the market participant personality module are subject to a daily market capitalization amount check in relation to a daily market cap figure held within a static data module.

26. The system of claim 1, wherein incoming orders from one of the client personality module and the market participant personality module are subject to a traded volume percentage check in relation to an average daily volume held within a static data module.

27. The system of claim 1, wherein incoming orders from one of the client personality module and the market participant personality module are subject to a traded volume amount check in relation to a total daily volume held within a static data module.

28. The system of claim 1, wherein incoming orders from one of the client personality module and the market participant personality module are subject to a value at risk (VAR) amount check in relation to a value of the incoming order against a VAR figure held within a static data module and a dynamic market data module.

29. The system of claim 1, wherein incoming orders from one of the client personality module and the market participant personality module are subject to a lot size validity check in terms of a static data personality module and a start of day file.

30. The system of claim 1, wherein incoming orders from one of the client personality module and the market participant personality module are subject to a tick size validity check in terms of a static data personality module and a start of day file.

31. The system of claim 1, wherein incoming orders from one of the client personality module and the market participant personality module are subject to validity checks in terms of valid order types allowable by the liquidity venue personality module.

32. The system of claim 19, wherein the service module and log personality module allows an operator to manually correct prices that have been wrongly sent by the liquidity venue personality module.

33. The system of claim 1, wherein the risk assessment system maintains a list of locked instruments that one of the client or a market participant are not authorized to trade.

34. The system of claim 1, wherein the liquidity venue personality module replicates the liquidity trading venue rules in order to calculate compliance with the liquidity venue rules prior to sending an order to that liquidity venue.

35. The system of claim 1, wherein the liquidity venue personality module communicates with the client personality module to provide acknowledgement of orders & completions to the client or a market participant.

36. The system of claim 1, wherein each client personality module maintains a record of trading data for orders or transactions by the client throughout a trading period in order to calculate real-time trading capability by combining pre-trade risk parameters set by an operator and data from any transactions or orders subsequent to the pre-trade risk parameters being set.

37. The system of claim 1, wherein an order is forwarded to a liquidity venue only if the order has passed all of pre-trade checks.

38. The system of claim 1, wherein any order that is rejected by the system will result in a message of rejection to be sent to the client and market participant.

39. A method for providing risk assessment, comprising:
providing a printed circuit board having one or more programmable logic devices, each installed on the printed circuit board and electrically connected to each other, the one or more programmable logic devices comprising two or more personality modules, the two or more personality modules being selected from a group consisting of a client personality module, a market participant personality module, a liquidity venue personality module and a market data personality module;
collectively performing, by the two or more personality modules, a pre-trade risk assessment for a particular client;
forwarding a first trade order for the particular client to a liquidity venue if the first trade order satisfies a set of risk criteria stored in a client personality module for the particular client;
updating a risk profile of the particular client in real-time without reliance on an order acknowledgement from the liquidity venue based on an assumption that the first trade order forwarded to the liquidity venue is completed even without receiving an order acknowledgement from the liquidity venue;
forwarding a second trade order for the particular client to the liquidity venue subsequent to the first trade order based on the updated risk profile without receiving an order acknowledgement from the liquidity venue for the first trade order;
determining that a first personality module of the two or more personality modules has failed; and
replacing the first personality module with a hot spare personality module, the hot spare personality module implemented on a hot spare programmable logic device installed on the printed circuit board, wherein
the hot spare programmable logic device stores a set of code for each of the two or more personality modules so that the hot spare personality module can replicate any of the two or more personality modules should any of the two or more personality modules fail,
the two or more personality modules are written to the one or more programmable logic devices using VHSIC Hardware Description Language (VHDL),
the one or more programmable logic devices comprise at least one of a complex programmable logic device (CPLD), a field programmable gate array (FPGA), or a field programmable object array (FPOA).

40. The method of claim 39, wherein the two or more personality modules are the client personality module, the liquidity venue personality module and the market data personality module and further comprising storing, in the client personality module, a set of risk data for a particular client, interacting, using the liquidity venue personality module, the client personality module with the liquidity venue to send a trade and receive notifications of a completed trade and gathering, using the market data personality module, data about a particular market and performing, using the client personality module and the liquidity venue personality module, pre-trade risk assessment for the client with reduced latency.

41. The method of claim 39, wherein the two or more personality modules are the client personality module and the liquidity venue personality module and further comprising storing, in the client personality module, a set of risk data for a particular client, interacting, using the liquidity venue personality module, the client personality module with the liquidity venue to send a trade and receive notifications of a completed trade, and performing, using the client personality module and the liquidity venue personality module, pre-trade risk assessment for the client with reduced latency.

42. The method of claim 39, wherein the two or more personality modules are the market participant personality module and the liquidity venue personality module, and further comprising storing, in the market participant personality module, a set of risk data for a particular market participant, interacting, using the liquidity venue personality module, the market participant personality module with the liquidity venue to send a trade and receive notifications of a completed trade, and performing, using the market participant personality module and the liquidity venue personality module, pre-trade risk assessment for the market participant with reduced latency.

43. The method of claim 39, wherein the two or more personality modules are the market participant personality module, the liquidity venue personality module and the market data personality module, and further comprising storing, in the market participant personality module, a set of risk data for a particular market participant, interacting, using the liquidity venue personality module, the market participant personality module with the liquidity venue to send a trade and receive notifications of a completed trade, gathering, using the market data personality module, data about a particular market, and performing, using the market participant personality module and the liquidity venue personality module, pre-trade risk assessment for the market participant with reduced latency.

44. The method of claim 39, wherein the two or more personality modules are the client personality module, the market participant personality module and the liquidity venue personality module and further comprising storing, in the client personality module, a set of risk data for a particular client, storing, in the market participant personality module, a set of risk data for a broker in a liquidity venue, interacting, using the liquidity venue personality module, the client personality module and the market participant personality module with the liquidity venue to send a trade and receive notifications of a completed trade, and performing, using the client personality module, the market participant personality module and the liquidity venue personality module, pre-trade risk assessment for the market participant with reduced latency.

45. The method of claim 39 further comprising performing, using a command and control personality module, start-up of the embedded risk assessment method.

46. The method of claim 45 further comprising polling, by each of the command and control personality module and the two or more personality modules, each personality module to determine if a personality module has failed.

47. The method of claim 40 further comprising collecting, by the market data personality module, real-time data from one or more liquidity venues and converting the real-time data from one or more liquidity venues into common format market data.

48. The method of claim 40 further comprising performing, by the client personality module, a market surveillance check for orders in one of the same direction, price, side, and quantity as an order of the client.

49. The method of claim 40 further comprising controlling, by the client personality module, one or more trades of the client based on the risk data for the particular client.

50. The method of claim 40 further comprising ensuring, by the client personality module, regulatory compliance of the client by controlling access to multiple liquidity venues.

51. The method of claim 44 further comprising providing, by the client personality module, an end of day data of the current risk profile to the market participant personality module for use in other physical locations.

52. The method of claim 45 further comprising enabling, by the command and control personality module, remote control by an operator using a remote graphical user interface (GUI).

53. The method of claim 39 further comprising maintaining, by a log audit personality module, a time stamped record of all message flows and configuration changes within the risk assessment.

54. The method of claim 39 further comprising providing, by a market execution personality module, a start of day file of the current client risk profile to the client personality module.

55. The method of claim 39 further comprising allowing, by a service module and log personality module, manual intervention in the event of a trade message being lost or in error.

56. The method of claim 45 further comprising enabling, by the command and control personality module, the configuration of new and existing personality modules with new risk profiles.

57. The method of claim 45 further comprising providing, by the command and control personality module, direct and exclusive control of any client personality modules by a market participant operator.

58. The method of claim 45 further comprising filtering incoming orders from one of the client personality module and the market participant personality module by a dynamic percentage price check in relation to a latest price held within the market data personality module.

59. The method of claim 45 further comprising filtering incoming orders from one of the client personality module and the market participant personality module by a static percentage price check in relation to a market opening price.

60. The method of claim 39 further comprising recording, by a status personality module, incoming orders from one of the client personality module and the market participant personality module in order to provide an independent view of a current risk status of orders.

61. The method of claim 39 further comprising performing for incoming orders from one of the client personality module and the market participant personality module a daily market capitalization amount check in relation to a daily market cap figure held within a static data module.

62. The method of claim 39 further comprising performing for incoming orders from one of the client personality module and the market participant personality module a traded volume percentage check in relation to an average daily volume held within a static data module.

63. The method of claim 39 further comprising performing for incoming orders from one of the client personality module and the market participant personality module a traded volume amount check in relation to a total daily volume held within a static data module.

64. The method of claim 39 further comprising performing for incoming orders from one of the client personality module and the market participant personality module a value at risk (VAR) amount check in relation to a value of the incoming order against a VAR figure held within a static data module and a dynamic market data module.

65. The method of claim 39 further comprising performing for incoming orders from one of the client personality module and the market participant personality module a lot size validity check in terms of a static data personality module and a start of day file.

66. The method of claim 39 further comprising performing for incoming orders from one of the client personality module and the market participant personality module a tick size validity check in terms of a static data personality module and a start of day file.

67. The method of claim 39 further comprising performing for incoming orders from one of the client personality module and the market participant personality module a validity check in terms of valid order types allowable by the liquidity venue personality module.

68. The method of claim 39 further comprising allowing an operator to manually correct prices that have been wrongly sent by the liquidity venue personality module.

69. The method of claim 39 further comprising maintaining a list of locked instruments that one of the client or a market participant are not authorized to trade.

70. The method of claim 39 further comprising replicating, by the liquidity venue personality module, a set of liquidity trading venue rules associated with the liquidity venue in order to calculate compliance with the liquidity venue trading rules prior to sending an order to that liquidity venue.

71. The method of claim 39 further comprising providing, by the liquidity venue personality module, acknowledgement of orders and completions to the client or a market participant.

72. The method of claim 39 further comprising maintaining a record of trading data for orders or transactions by that client throughout a trading period in order to calculate real-time trading capability by combining pre-trade risk parameters set by an operator and data from any transactions or orders subsequent to the pre-trade risk parameters being set.

73. The method of claim 39 further comprising validating an order against one or more pre-trade checks and forwarding the order to a liquidity venue only if the order has passed the one or more pre-trade checks.

74. The method of claim 39 further comprising sending a message of rejection to the client and a Market Participant when an order is rejected.

75. An embedded risk assessment system, comprising:
a printed circuit board;
a first programmable logic device installed on the printed circuit board comprising a market data personality module configured to collect real-time market data streams from one or more liquidity venues;
a second programmable logic device installed on the printed circuit board comprising a liquidity venue personality module configured to interact with a first liquidity venue of the one or more liquidity venues;
a third programmable logic device installed on the printed circuit board comprising a market execution personality module associated with a broker having a membership at the first liquidity venue;
a fourth programmable logic device installed on the printed circuit board comprising a client personality module associated with a client of the broker; and
a fifth programmable logic device installed on the printed circuit board comprising a hot standby personality module configured to replicate any of the market data personality module, the liquidity venue personality module, the market execution personality module, and the client personality module if a personality module failure is detected, wherein
each of the market data personality module, the liquidity venue personality module, the market execution personality module, the client personality module, and the hot standby personality module are written to the first programmable logic device, the second programmable logic device, the third programmable logic device, the fourth programmable logic device, and the fifth programmable logic device, respectively, using VHSIC Hardware Description Language (VHDL),
each of the first programmable logic device, the second programmable logic device, the third programmable logic device, the fourth programmable logic device, and the fifth programmable logic device comprise at least one of a complex programmable logic device (CPLD), a field programmable gate array (FPGA), or a field programmable object array (FPOA),
the client personality module updates a risk profile of the client in real-time without reliance on order acknowledgements from the liquidity venue, wherein the updates to the risk profile are performed based on an assumption that all orders transmitted to the liquidity venue are completed even if order acknowledgements have not yet been received for the orders from the liquidity venue, and
the client personality module permits transmission of subsequent orders by the client to the liquidity venue based on the risk profile of the client even if order acknowledgements have not yet been received for previous orders transmitted to the liquidity venue.

* * * * *